United States Patent [19]

Drobot

[11] 4,293,333
[45] Oct. 6, 1981

[54] MICROBIOLOGICAL RECOVERY OF METALS

[75] Inventor: Walter Drobot, Montclair, N.J.

[73] Assignee: Engelhard Minerals & Chemicals Corporation, Iselin, N.J.

[21] Appl. No.: 120,798

[22] Filed: Feb. 12, 1980

[51] Int. Cl.³ .................... C22B 11/04; C22B 15/00; C22B 19/00; C22B 23/00

[52] U.S. Cl. ................................. 75/101 BE; 75/108; 75/117; 75/118 R; 75/118 P; 75/119; 75/120; 75/121; 210/601; 210/688; 423/22; 423/24; 423/100; 423/112; 423/139

[58] Field of Search .................. 75/108, 101 BE, 121, 75/118 R, 118 P, 117, 118, 120; 423/22, 24, 100, 112, 139; 210/2, 38 B

[56] References Cited

U.S. PATENT DOCUMENTS

| | | | |
|---|---|---|---|
| 2,641,567 | 6/1953 | Perlman et al. | 435/254 X |
| 3,151,038 | 9/1964 | Gray | 435/254 |
| 3,620,927 | 11/1971 | Leathen | 435/254 X |
| 3,937,520 | 2/1976 | Sievert | 75/101 R |
| 4,021,368 | 5/1977 | Nemec et al. | 435/254 X |
| 4,067,821 | 1/1978 | Votapek et al. | 210/38 B X |

Primary Examiner—G. Ozaki

[57] ABSTRACT

A process for recovering metals from aqueous media containing metal in solution, and especially from industrial waste water. The process includes the steps of contacting the aqueous medium with fungus for a period of time sufficient to allow the fungus to extract metal in a water-insoluble form from the solution. The metal may then be recovered from the fungus. Fungi of the species Cladosporium, Penicillium, Trichoderma, Black Mycelium and Aureobasidium, have been found to be particularly useful in the process of the present invention. The process is useful, both as a water purification process and as a metals recovery process.

27 Claims, 1 Drawing Figure

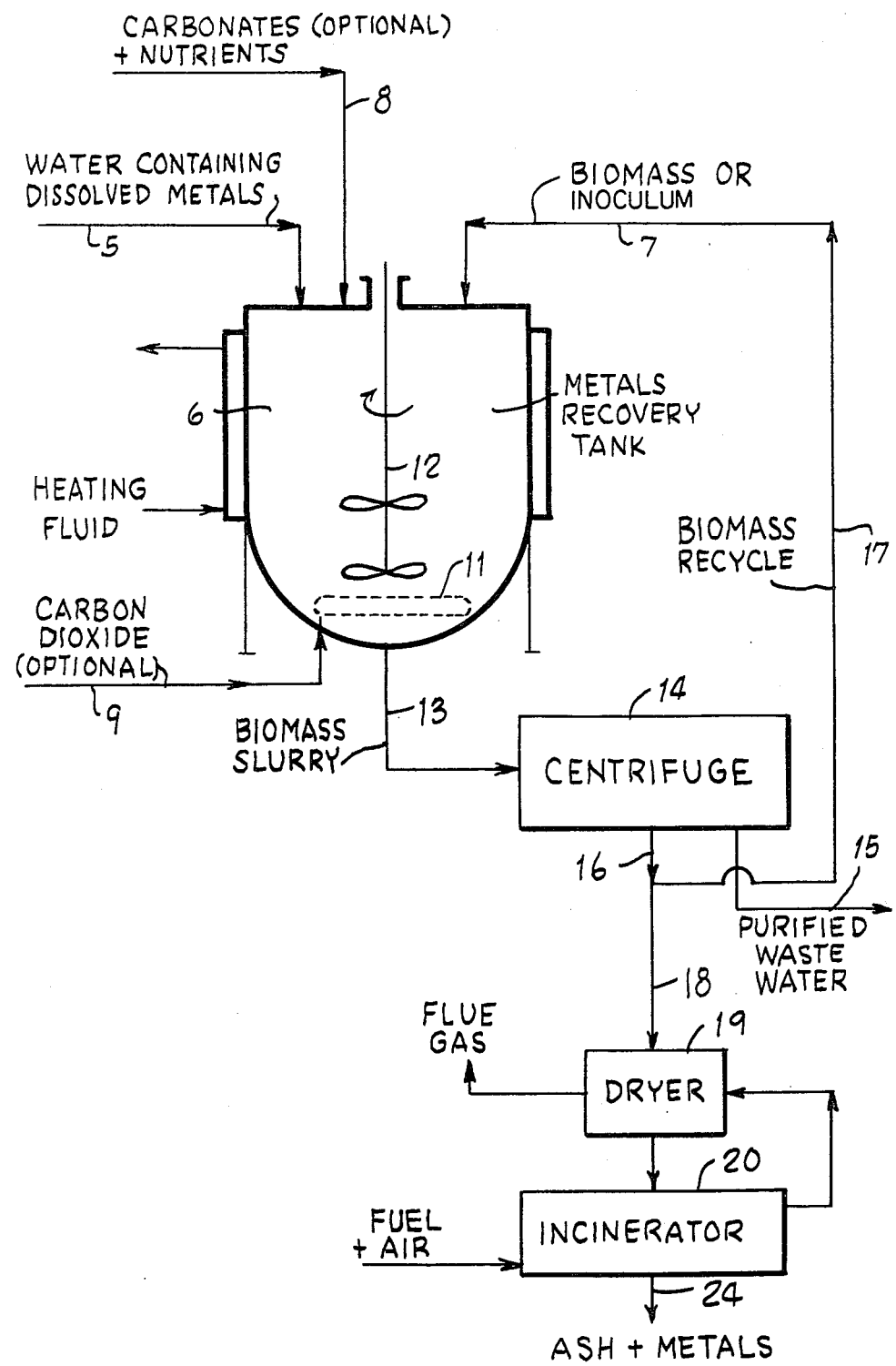

MICROBIOLOGICAL RECOVERY OF METALS

This invention relates to a process for separating metals from aqueous media containing dissolved metal salts by treatment with various fungi. The process is particularly effective for the recovery of precious metals, including platinum, rhodium, palladium, ruthenium, iridium and gold from dilute aqueous solutions.

Waste waters from metallurgical processes of various types contain dissolved salts of precious metals, such as platinum, rhodium, palladium, ruthenium, gold, iridium and silver, as well as base metals, such as zinc, aluminum, iron, copper, tin and nickel. Frequently the concentrations of the salts are so low that the cost of recovering the metal values exceeds the market value of the recovered metals.

The present invention provides a simple, relatively low-cost method for recovering metals present in solutions in relatively low concentrations, as in industrial waste waters, especially in metallurgical waste waters, and in other aqueous media, such as ground waters, sea water, and the like. The process of this invention is particularly useful for the recovery of metals from acidic solutions, e.g., solutions having a pH less than 4.

The precipitation of gold, silver, platinum and palladium from acidic solutions by means of dried fungus of the species Aspergillus has been reported by Mineev, G. E. et al., "Use of Microorganisms for Noble Metal Precipitation from Acid Industrial Solutions", Anal. Teckhnol. Blagorod. Metal., 1971, 347–349.

A copending patent application Ser. No. 120,800, filed concurrently herewith, discloses a process for the recovery of precious metals from an aqueous solution by contacting the solution with killed fungi, such as may be accomplished by heat treating.

The use of certain bacteria to solubilize compounds of metals is also known in the prior art. For example, the leaching of iron from ore is disclosed in U.S. Pat. No. 2,829,964 to Zimmerly, wherein a sulfide ore is contacted with an acidic ferric sulfate lixiviant containing iron oxidizing autotropic bateria such as *Thiobacillus ferrooxidans*. The recovery of metal values from ores by generating a leaching agent by the action of certain bacteria is disclosed in U.S. Pat. No. 3,937,520 to Sievert.

The present invention, provides a process for recovering metal converted to the insoluble form from aqueous solutions of water soluble metal compounds by treating aqueous media containing metals in a water soluble form with one or more live filamentous fungi commonly called molds. Fungi which have been found useful in the process of this invention are molds commonly found in the environment in soil and in surface waters, including tap water from municipal water supplies.

By the process of the present invention metals can be recovered in the insoluble form from aqueous solutions. The process is especially useful for the recovery of precious metals from industrial waste waters by contacting the waste water with one or more of the selected fungi in relative proportions and for a period of time sufficient to effect extraction of the major portion of the precious metals from the aqueous solution. The recovered metal is deposited and concentrated in the biological mass, or "biomass" and may be readily recovered from the aqueous media and from the biomass by relatively simple methods. The term "biomass", as used herein, is intended to include not only the fungal growth, per se, but also culture media containing live fungi.

The drawing is a simplified flow diagram illustrating one embodiment of apparatus suitable for carrying out the process of the present invention.

In accordance with the present invention, metal is recovered from an aqueous medium containing the metal in soluble forms by inoculating or contacting the aqueous medium with a live fungus for a period of time sufficient to allow the fungus to convert soluble metals to an insoluble form of the metal, separating the fungus containing captured metal from the aqueous medium and recovering metal from the fungus.

The present invention may be employed to recover either precious metals or base metals. For example, the process of the invention may be used to recover in insoluble forms the precious metals platinum, rhodium, palladium, ruthenium, iridium and gold. Base metals which may be recovered by this process include zinc, aluminum, iron, copper, nickel, cobalt, manganese and chromium. Other metals which may be recovered by use of the invention include rhenium, silver, boron, tin and iridium. By means of the invention, metals present in an aqueous medium in soluble forms are converted into insoluble solid forms. Specific examples of fungi which have been found useful in the process of this invention are Cladosporium, Penicillium, Trichoderma, a black cephalosporial mold, designated Black Fungus, and a black chlamydosporial mold, identified as a non-sporulating strain of Aureobasidium, designated Black Mycelium.

The fungus cultures which are employed may be prepared and maintained by conventional biological procedures well known in the art.

One embodiment of this invention involves inoculating or contacting the aqueous medium containing dissolved metal with live fungus under growth conditions for a period of time sufficient to allow the fungus to grow and simultaneously convert soluble metal to insoluble metallic forms. A single fungus species or a mixture may be used in the process. The fungi usually are found admixed with one another in their natural environment.

In an aqueous environment, the fungi useful in the process of this invention have been observed to accumulate on surfaces of calcium carbonate or some mineral equivalent such as Dolomitic limestone. Where calcium carbonate is present in the growth medium used in carrying out the process of this invention, the recovered metals may, as a result, be diluted with insoluble calcium compounds.

The fungi may be grown and accumulated on the surfaces of high calcium mineral limestone granules in the aqueous medium. When the fungi are provided with a localized source of insoluble carbonate, such as high calcium or dolomitic limestones, a concentrated nodular growth is induced which may be efficiently separated from the surrounding aqueous medium. Natural limestone are proposed as a readily available substrate which is widespread in the natural environment.

Based on visual observations, the growth of the fungi and efficient recovery of metals from aqueous solutions are beneficiated by the presence of a solid surface substrate on which they may attach. Where large volumes of aqueous medium are to be treated, it may not be feasible or economical to distribute the components essential to fungal growth, including the nutrients, throughout the entire aqueous phase. In such circumstances, the need for a solid substrate and the need for certain nutrients may be satisfied jointly by incorporating the nutrients, essential elements and supplements into the solid support. The solid support may be, for example, an insoluble carbonate surface with essential nutrients and supplements incorporated into the carbonate surface, or encapsulated such that their rate of dissolution into the water does not excessively exceed the rate of metabolic consumption by the fungus. By these means, the components essential to microorganism growth are consumed only at the reactive site, and are not needlessly dissipated throughout a large volume of aqueous medium.

An organic carbon nutrient source serves to support the metabolism of the fungi. The growth rates of the fungi are enhanced by the presence of formic acid, and citric acid, as well as other organic compounds commonly used as microbiological nutrients. Formic acid and citric acid have been found to be a particularly useful medium supplement, causing a rapidly initiated and long-lasting increase in the growth rate of the fungi as compared with the growth rate when no organic supplement is used. Visual observations indicated that methyl alcohol and mineral oil are effective to lesser degrees, with methyl alcohol causing a greater growth response than mineral oil. The organic nutrient compounds may be employed individually or in combination.

The nutrient compounds may be added directly to the aqueous phase or into the surface of the solid substrate, or encapsulated in a known manner such that the rate of solution of nutrients into the water does not excessively exceed the rate of metabolic consumption by the organism. Co-precipitation of calcium carbonate and calcium citrate is one means of preparing a solid substrate which will simultaneously provide the fungi with carbonate and with an organic nutrient. Nitrogen may be supplied from any suitable sources, e.g., from commercial ammonium sulfate, ammonium nitrate, aqua ammonia, or amino acids. As is known in the art, other factors are involved in the growth of the preferred fungi for use in this invention, e.g., daylight and fluorescent light may affect growth, and free chlorine or hypochlorites may adversely affect growth.

The fungi may be cultured and the metals removed from aqueous solutions at any suitable temperatures. As a practical matter, temperatures in the range of from just above that at which the solution freezes up to pasturerization temperature, i.e., that which an appreciable proportion of the fungi would be killed, may be used. Temperatures in the range of 5° to 50° C., preferably, 20° to 40° C., are preferred. The biomass containing separately cultured fungi may be treated with acid, e.g., hydrochloric acid, prior to contact with the aqueous solution of metal to maintain the metal solution pH sufficiently low, e.g., 1 to 3, to minimize base metal precipitation during recovery of precious metals.

The preferred fungi for use in the process of this invention propagate in aqueous media having pH values ranging from 0.8 to 9.6 or higher. The naturally-assumed pH level of these microorganisms may lie between approximately 4 and about 8. As microbiological activity proceeds in either acidic or alkaline solutions, the pH of such solutions may gradually approach a value in the range of about 7 to about 8.

The process of this invention involves inoculating or contacting a metal ion-containing aqueous medium with a fungus for a period of time sufficient to allow the fungus to convert metal ions to an insoluble form, and then separating the insolubilized metal from the aqueous medium. This general process may be carried out by any of a number of alternative routes.

Fungus cultures may be prepared and grown by conventional biological procedures and then introduced directly into contact with the metal ion-containing aqueous medium.

Alternatively, the aqueous medium may be inoculated with the fungus spores or live fungus culture and the fungus grown in the aqueous medium containing the dissolved metals. Optionally, carbonate or dissolved carbon dioxide as well as organic and inorganic nutrients may be added to the aqueous medium as described above. Mixing, whether natural (such as the flow of a stream) or by artificial means, facilitates growth of the fungi and removal of the metal ions from solution. Air or carbon dioxide sparging or mechanical mixing may be employed. Carbon dioxide may serve as a supplemental carbonate source as well as a means of agitation. Combustion flue gas may be used as the source of carbon dioxide in commercial plant operations. The introduction of carbon dioxide directly, or alternatively by the addition of carbonate compounds, may serve as a substitute for oxygen where aeration might be not readily achieved. The substitution of a carbonate system may be particularly useful in deep river, lake or ocean beds where natural aeration may be deficient. In such cases, insoluble carbonates such as limestones also serve to concentrate and limit the microbial growth and metal removal to the actual vicinity of the carbonate surface so introduced.

Once a microbiological seed stock is established in a metals recovery operation, the fungus strain may be maintained by recycling a portion of the cultured fungus to the next batch of aqueous medium undergoing treatment. Ultimately, the metal contained in the fungus is recovered from the biological mass.

For the treatment of relatively small volumes of metal-containing water, the active biological growth surface including fungus and nutrients may be incorporated into an expendable contacting unit, for example, in a fibrous element or surface or a like containing mechanism. The metal-containing aqueous effluent stream or contacting the biological growth surface, is processed thereby for the recovery of metals.

In another application of the process of this invention, the biological growth surface may itself be regularly harvested for accumulated metals. In other words, the fungus may be grown in the aqueous solutions containing dissolved metals and regularly harvested and processed for the recovery of metals.

Alternatively, a continuously replenished contacting surface may be employed for processing the aqueous medium. For example, a moving belt or other rotating surface may be passed through the aqueous medium, then through a disengaging stage where the fungus culture containing metals is recovered, next through a surface precoating stage where a biomass containing a fungus and encapsulated nutrient is coated onto the contractor surface, and then back into the aqueous medium. A flexible porous solid, e.g., a plastic or rubber foam suface or paper surface may be employed as the contactor surface. If the metal-bearing fungi are disposed on a flexible foam substrate, for example, the substrate may be compressed to free the fungal mass.

The use of encapsulated nutrients and minerals in a metals removal system necessarily results in some dilution of the separated metals concentrate by excess nutrients and minerals which remain unconsumed by the fungus. Generally, however, this dilution is economically justified by a higher rate of metal recovery. An encapsulated nutrients and minerals system may be used as a static collector or in a continuous flow process.

Thus the process of the invention may be carried out in batch or continuous fashion or in a process with some batch and some continuous stages. A multi-step operation may be preferred, for example, high-rate removal on a precoated moving belt collector surface followed by a batch concentration step on a static fixed surface collector.

The primary separation of the metal-bearing fungi which are dispersed in the aqueous medium may also be carried out by conventional methods, such as filtration or centrifugation. Centrifugal separation is preferred for primary separation since filtration media are easily clogged by fungus cells.

When paramagnetic metals, or compounds involving metals, such as iron, nickel and cobalt, are concentrated in the fungal biomass, with or without other metals, the concentrate will migrate to a magnetic source. Magnetic or electromagnetic separation of fungus concentrates may be used as a primary separation step or as a secondary separation step, following primary separation by centrifugation or filtration.

The separated metals may be recovered from the fungus concentrate, for example, by drying and calcining the microbiological encapsulant to leave a residue of finely-divided metals, or their various compounds. The finely divided solids may in turn be separated from one another by conventional solid classification methods. Other metals recovery procedures might include selective solvent extraction or acid digestion as a means of producing a dissolved metal concentrate.

The process of this invention is illustrated in the accompanying drawing which is a diagrammatic representation of a specific preferred embodiment of means for carrying out the process of the invention.

With reference to the figure, an aqueous medium, such as a waste water, containing one or more soluble metal salts is fed through line 5 into the metals recovery tank 6, which is preferably jacketed to maintain a controlled temperature within the tank. A fungal mass is added to the tank line 7 in an amount equivalent to about 5 volume percent of the total liquid and solid content of the tank. The pH, temperature, degree of aeration or agitation, as required for process tank treatment, normally produces aerobic conditions. Treatment without agitation, such as in long-time storage, tends to become anaerobic and under these conditions the carbonate content supplements the effects of a depleted content of dissolved oxygen. The carbonate ion or dissolved carbon dioxide content, and organics content of the medium in the tank may be adjusted in accordance with the considerations discussed above. Carbonates and nutrients may be supplied to tank 6 via line 8 while carbon dioxide or air may be supplied through line 9 and sparger 11. The batch exposure time for incubation and metals removal in the recovery tank may range from 4 to 48 hours, usually about 24 hours, and depending on the addition ratio of fungi. The contents of the tank may be agitated by stirrer 12.

At the end of the batch time, the contents of the tank are emptied through line 13 into a centrifuge 14 and the liquid drawn off through line 15. It may be desirable to filter the concentrate the assure the recovery of all converted metals prior to discarding the treated solution.

The biomass containing fungi and removed metals is discharged from the centrifuge through line 16. A part of the biomass may then be returned via lines 17 and 7 to the metals removal tank 6 as seed material in the form of a wet concentrate. The remaining wet concentrate is passed through line 18 to a dryer 19 and an incinerator 20. Ash and recovered dry powdered insoluble metals are discharged through line 24 to further processing for recovery of the various metals by known methods.

As an alternative embodiment, the process of this invention may comprise the steps of contacting an aqueous medium containing metal salts in solution with a fungus separately propagated and then added for a period of time sufficient to allow the fungus to convert the dissolved metals to insoluble metal compounds, and then separating the fungus containing the removed metals from the aqueous medium by sedimentation. In this embodiment, the process may serve as a means for purifying the aqueous medium without necessarily serving as a means for recovering elemental metals.

The following examples illustrate the selectiveness of the different fungi for various metals.

EXAMPLES 1-4

An acidic test solution of water soluble metal salts was prepared to simulate an industrial metals refinery waste water. The solution contained platinum, iridium, palladium, ruthenium, rhodium, gold, iron, zinc, copper, aluminum, and nickel.

Fungi of each of the species Penicillium, Cladosporium, as well as two other species designated as Black Fungus and Black Mycelium, were separately cultured in a soy bean meal medium on a rotary shaking machine at 28° C. for 6 days. The culture was centrifuged at 6000 rpm in a Lourdes VRA rotor for 10 minutes and the supernatant liquid was discarded. The fungus cells were then washed with distilled water, recentrifuged, and the supernatant liquid again discarded. The cells were suspended in distilled water and filtered through Reeve Angle No. 802 paper. Ten grams of the resultant biomass were placed in a 2000 ml Erlenmeyer flask with 200 ml of the test solution to give an equivalent microorganism addition of 37.5 g/l and the flask was placed on a reciprocal shaking machine for 5 hours at 28° C. A control sample consisting of 200 ml of the test solution was placed in a similar flask on the shaking machine. At the end of the test period, the contents of the two flasks were separately filtered through Reeve Angle No. 902 paper.

The concentration, in milligrams per liter, of the metals remaining in the filtrate was determined by analysis with the results indicated in Table I. In the table, the percentage recovery of the metal values is calculated by the difference between the metal concentration in the filtrates and the initial metal concentration in the test solution.

TABLE I

| Metal | Control Sample mg/l | Example 1 Cladosporium | | Example 2 Penicillium | | Example 3 Black Fungi | | Example 4 Black Mycelium | |
|---|---|---|---|---|---|---|---|---|---|
| | | Final Conc. mg/l | Percent Removed % | Final Conc. mg/l | Percent Removed % | Final Conc. mg/l | Percent Removed % | Final Conc. mg/l | Percent Removed % |
| Pt | 2.3 | 0.08 | 96.5 | 0.22 | 90.4 | 0.11 | 95.2 | 0.04 | 98.2 |
| Au | 0.47 | 0.007 | 98.5 | 0.29 | 38.3 | 0.02 | 94.9 | 0.02 | 95.5 |
| Pd | 1.7 | 0.04 | 97.9 | 0.47 | 72.3 | 0.09 | 95.2 | 0.04 | 97.9 |
| Ru | 0.64 | 0.17 | 73.4 | 0.24 | 62.5 | 0.16 | 75.0 | 0.18 | 71.9 |
| Ir | 0.91 | 0.45 | 50.6 | 0.36 | 60.4 | 0.44 | 51.6 | 0.47 | 48.4 |
| Rh | 0.83 | 0.53 | 36.1 | 0.57 | 31.3 | 0.54 | 34.9 | 0.51 | 38.6 |
| Fe | 4.8 | 2.8 | 41.7 | 3.2 | 33.3 | 2.1 | 56.3 | 2.1 | 56.3 |
| Cu | 6.9 | 1.9 | 72.5 | 5.3 | 23.2 | 4.0 | 42.0 | 3.5 | 49.3 |
| Ni | 6.5 | 4.5 | 30.8 | 4.5 | 30.8 | 5.4 | 16.9 | 5.4 | 16.9 |
| Zn | 6.6 | 5.1 | 22.7 | 0.61 | 90.9 | 5.6 | 15.2 | 6.0 | 9.1 |
| Al | 38. | 32. | 15.8 | 37. | 2.7 | 29. | 23.7 | 31. | 18.4 |
| pH Start | 2.3 | 2.4 | | 2.45 | | 2.6 | | 2.5 | |
| Finish | 2.3 | 3.1 | | 2.6 | | 3.2 | | 3.1 | |

Equivalent Microorganism Addition, 37.5 g/l

EXAMPLE 5

Fungus of the genera Trichoderma obtained from a metallurgical plant waste water was cultured and separated from the culture medium as described above. This fungus was tested for its effectiveness for the recovery of metals from solution as described in Examples 1-4 except that the test was carried out for 40 hours at 28° C. with a test solution leaner in precious metals than the test solution employed in Examples 1-4. Results are shown in Table II.

TABLE II

| Metal | Test Solution mg/l | Filtrate mg/l | Recovery % |
|---|---|---|---|
| Pt | 0.16 | 0.061 | |
| Rh | 0.16 | 0.006 | 96 |
| Pd | 0.15 | 0.066 | 56 |
| Ru | 0.14 | 0.009 | 94 |
| Au | 0.17 | 0.020 | 88 |
| Ir | 0.18 | 0.14 | 22 |
| Zn | 9.1 | 0.10 | 99 |
| Fe | 12.0 | 0.50 | 95 |
| Cu | 13.0 | 3.8 | 71 |
| Al | 11.0 | 0.64 | 94 |
| Ni | 10.4 | 3.4 | 67 |
| pH | 2.07 | 7.93 | |

As can be seen from the tables, all four fungi in a single step treatment demonstrated in varying degrees a selectivity for the removal of platinum, palladium, ruthenium, iridium and gold in the presence of base metals. Rhodium was removed to a lesser extent. Cladosporium gave substantial removal of all of the listed precious metals from the solution except rhodium and was found to be especially separable by filtration after treatment with the solution. The base metals were also removed to a greater and more consistent degree by the Cladosporium than by the other listed fungi.

All of the fungi tested in the above examples are suitable for recovery of all of the precious metals. Cladosporium is also very effective for the recovery of various base metals from aqueous solutions and is especially preferred for recovery of copper. Trichoderma and Penicillium are most useful for primary removal and separation of precious metals from base metals.

Since all of these fungi are widespread in the surrounding natural environment, they will eventually all propagate in a removal process that initially starts with only one of the species. If a single species is desired, it must therefore be periodically renewed by replacement with a pure culture of that species. The fungi employed in the examples were all separated and propagated from biological growths naturally present in samples of waste waters from the metals refineries of the Engelhard Industries Division of Engelhard Minerals and Chemicals Corporation, i.e., the Hanovia Plant in East Newark, New Jersey and Delancy Street Plant in Newark, New Jersey.

It will be apparent from the above description of the process of this invention that the process may be employed as an ecological tool to purify waste water, including industrial waste water, or to purify natural bodies of water. For example, the process may be used to recover metals from the spent liquors and ore tailings leachates encountered in the hydrometallurgical and physical refining of metallic ores. The invention may also serve as a means for recovering valuable metals from waters, from wells, or springs, or from aqueous media employed in in-situ leaching operations as a means for mining metals from natural ore bodies.

I claim:

1. A process for removing metal from an aqueous medium containing in solution one or more metals selected from the group consisting of platinum, rhodium, palladium, ruthenium, gold, rhenium, silver, iridium, zinc, aluminum, iron, copper, nickel, cobalt, manganese, chromium, boron, and tin; which comprises contacting said aqueous medium with at least one live fungus from the molds family for a period of time sufficient to allow the fungus to extract metal from said solution in water insoluble form.

2. The process of claim 1 wherein the fungi are selected from the group consisting of Cladosporium, Penicillium, Trichoderma, Black Mycelium, and Aureobasidium and combinations of two or more thereof.

3. The process of claim 1 or claim 2 wherein the extracted metal is recovered from said fungus containing said metal.

4. The process of claim 1 or claim 2 wherein said aqueous medium contains precious metal and base metal in solution and further including maintaining the pH of said aqueous medium sufficiently low to mimimize precipitation of base metal during extraction and separation of said precious metal.

5. The process of claim 4 wherein the pH is maintained between about 1 to 3.

6. The process of claim 1 or claim 2 wherein the extraction takes place at a temperature in the range of from above the freezing point of said solution to about 50° C.

7. The process of any one of claim 1 or claim 2 wherein the fungus is maintained in contact with said solution for a period of at least four hours.

8. The process of claim 1 wherein nutrients for the fungus are included in said aqueous medium.

9. The process of claim 8 wherein nutrients for the fungus are incorporated in a surface contacting medium, and said extraction is effected by passing said aqueous medium over said surface contacting medium.

10. The process of claim 1 or claim 2 wherein the fungus containing said metals is separated from the resulting treated aqueous medium.

11. The process of claim 1 or claim 2 wherein precious metals are preferentially removed from a solution containing precious metals and base metals by maintaining the pH of said solution within a range of 1 to 3.

12. A process for recovering metal in insoluble form from an aqueous medium containing in solution one or more metals selected from the group consisting of platinum, rhodium, palladium, ruthenium, gold, rhenium, silver, iridium, zinc, aluminum, iron, copper nickel, cobalt, manganese, chromium, boron, and tin; which comprises contacting said aqueous medium with at least one fungus selected from the group comprising the slime molds, maintaining said solution at a temperature within the range of 5° C. to 50° C. for a period of time sufficient to extract metal from said solution in water-insoluble form, separating fungus containing extracted metal from resulting aqueous medium, and recovering extracted metal from said separated fungus.

13. A process according to claim 12 wherein the temperature of said aqueous medium is maintained within the range of 20° C. to 40° C.

14. A process according to claim 12 wherein the pH of said aqueous medium is maintained within the range of 1 to 3.

15. A process according to claim 12 wherein said period of time is within the range of 4 hours to 6 days.

16. A process according to claim 12 wherein carbon dioxide is supplied to said aqueous medium.

17. A process according to claim 12 wherein said solution contains a nutrient for said fungus.

18. A process according to claim 17 wherein said nutrient is selected from the group consisting of formic acid, citric acid, methyl alcohol, and mineral oil.

19. A process according to claim 17 wherein said nutrient comprises a nitrogen compound selected from the group consisting of ammonium sulfate, ammonium nitrate, ammonium hydroxide and amino acids.

20. A process according to claim 17 wherein said aqueous medium is maintained in contact with calcium carbonate during the period of time required for growth of said fungus.

21. A process according to claim 17 wherein calcium carbonate and calcium citrate are co-precipitated and supplied to said solution to provide inorganic carbonate and organic nutrient.

22. A process according to claim 17 wherein said fungus and nutrients capable of promoting growth of said fungus are incorporated into a fibrous element and said fibrous element containing said fungus and nutrients is brought into contact with said aqueous medium.

23. A process as defined in claim 17 wherein said nutrients are incorporated in a matrix of limited water solubility and formed into discrete particles prior to addition to said solution.

24. A process according to claim 17 wherein said nutrients supplied to said aqueous medium are incorporated with calcium carbonate into a slowly soluble support structure for said fungus and said aqueous medium is maintained in contact with said support structure.

25. A process according to claim 17 wherein said fungus and said nutrient are coated onto a rotatable flexible substrate prior to contact with said solution and are contacted with said solution by rotation of said substrate.

26. The process of any one of claims 1, 2, 3 or 12 wherein said metals are one or more of platinum, rhodium, palladium, ruthenium, iridium, gold, iron, zinc, copper, aluminum and nickel.

27. The process of any one of claim 1, 2, 3, 5, 12 or 14 wherein the metal is platinum, rhodium, palladium, ruthenium, iridium and gold.

* * * * *